United States Patent
Hills

(10) Patent No.: US 7,462,308 B2
(45) Date of Patent: *Dec. 9, 2008

(54) ADDITIVES FOR SPECIAL EFFECT APPEARANCES IN PLASTIC PARTS

(75) Inventor: Richard Arnold Hills, Jackson, MI (US)

(73) Assignee: CertainTeed Corp., Valley Forge, PA (US)

( * ) Notice: Subject to any disclaimer, the term of this patent is extended or adjusted under 35 U.S.C. 154(b) by 939 days.

This patent is subject to a terminal disclaimer.

(21) Appl. No.: 10/872,690

(22) Filed: Jun. 21, 2004

(65) Prior Publication Data

US 2004/0232581 A1    Nov. 25, 2004

Related U.S. Application Data

(63) Continuation of application No. 10/389,400, filed on Mar. 14, 2003, now Pat. No. 6,752,941.

(60) Provisional application No. 60/364,169, filed on Mar. 14, 2002.

(51) Int. Cl.
*B29C 47/02* (2006.01)
*B29C 47/04* (2006.01)

(52) U.S. Cl. .................. 264/75; 264/122; 264/123; 156/244.11

(58) Field of Classification Search ............... 264/75, 264/122, 123; 156/244.11
See application file for complete search history.

(56) References Cited

U.S. PATENT DOCUMENTS

| | | | | |
|---|---|---|---|---|
| 2,790,202 | A | * | 4/1957 | Lorenian ............... 264/171.11 |
| 3,704,071 | A | * | 11/1972 | Muller et al. ............... 401/96 |
| 3,871,629 | A | * | 3/1975 | Hishida ...................... 366/76.2 |
| 3,875,088 | A | | 4/1975 | Arons et al. |
| 3,983,195 | A | | 9/1976 | Arons et al. |
| 4,048,101 | A | | 9/1977 | Nakamachi et al. |
| 4,302,410 | A | * | 11/1981 | Beach ........................ 264/45.9 |
| 4,356,216 | A | | 10/1982 | Gailey et al. |
| 4,356,217 | A | | 10/1982 | Wollam et al. |
| 4,411,215 | A | | 10/1983 | Gailey et al. |
| 4,411,218 | A | | 10/1983 | Wollam et al. |
| 4,505,569 | A | * | 3/1985 | Seto et al. ................... 399/218 |
| 4,528,155 | A | * | 7/1985 | Elder ..................... 264/171.19 |
| 4,649,008 | A | * | 3/1987 | Johnstone et al. ........ 264/177.1 |
| 4,810,733 | A | * | 3/1989 | Sakuma et al. .............. 523/206 |
| 5,053,176 | A | | 10/1991 | Cameron et al. |
| 5,053,444 | A | * | 10/1991 | Trotoir ........................ 523/351 |
| 5,126,088 | A | | 6/1992 | Andres |
| 5,232,751 | A | | 8/1993 | Cameron et al. |
| 5,387,381 | A | | 2/1995 | Saloom |
| 5,866,054 | A | | 2/1999 | Dorchester et al. |
| 5,866,639 | A | | 2/1999 | Dorchester et al. |
| 5,869,176 | A | | 2/1999 | Dorchester et al. |
| 5,998,006 | A | | 12/1999 | Bambara et al. |
| 2005/0003221 | A1 | | 1/2005 | Walrath |

FOREIGN PATENT DOCUMENTS

| WO | WO 97/04019 | 2/1997 |
|---|---|---|
| WO | WO 98/52996 | 11/1998 |

* cited by examiner

*Primary Examiner*—Eric Hug
*Assistant Examiner*—Seyed Masoud Malekzadeh
(74) *Attorney, Agent, or Firm*—Duane Morris LLP

(57) ABSTRACT

The present invention relates to a method of producing a plank product and related components having a controllable and realistic wood-grain appearance, the planks and related components having at least one accent color, the method including the steps of: a) introducing into an extruder a powdered or pelletized base material and accent color pellets, the base material containing less than about 75% by weight wood flour, and having a vicat softening temperature, the accent color pellets (i) having a higher vicat softening temperature than said base material, and (ii) including a styrene polymer having a high vicat softening temperature and a melt flow index of greater than or equal to 1.0 gram per 10 minutes, and at least one additional resin having a substantially lower vicat softening temperature than the styrene polymer; and b) extruding said base material and the accent color pellets through an extrusion die to form a plank under processing temperatures whereby the accent color pellets cause delayed introduction and controlled dispersion of the accent color into the plank material.

25 Claims, No Drawings

ADDITIVES FOR SPECIAL EFFECT APPEARANCES IN PLASTIC PARTS

CROSS REFERENCE TO RELATED APPLICATIONS

The present application is a Continuation of U.S. patent application Ser. No. 10/389,400, Filed Mar. 14, 2003, now U.S. Pat No. 6,752,941, which claims the benefit of U.S. Provisional Application No. 60/364,169, filed Mar. 14, 2002.

FIELD OF THE INVENTION

The present invention relates to additives and formulations which provide "special effect" appearances in plastic parts.

BACKGROUND OF THE INVENTION

For a number of years, manufacturers have attempted to produce plastic articles, such as vinyl siding, with simulated wood-grain or multicolored appearance. Various methods of forming such plastic articles have been used, but none has succeeded in achieving a realistic wood-grain appearance in which the wood grain is strongly accented against the background. One known process for forming vinyl siding having some wood-grain appearance is shown in U.S. Pat. No. 4,048,101 to Nakamachi. The disclosure of U.S. Pat. No. 4,048,101 is hereby incorporated by reference. Nakamachi discloses a process for producing a synthetic plastic wood product with a multi-color appearance by forming colored particles of a first styrene resin with additives including a foaming agent, a foaming control agent, an inert inorganic foam nucleating material, and a dry colorant, and blending these colored particles with colored pellets of a second styrene resin having a lower melt flow index than the first resin. Nakamachi's blended resins are then coextruded at which time the foaming agent increases the volume of the blended resins by 10% to 300%, and produces an annular ring pattern. U.S. Pat. No. 5,387,381, to Saloom also discloses a method for imparting a wood-grain appearance by coextrusion of a capstock including accent color pellets consisting essentially of acrylics and/or polycarbonates with a polyvinylchloride ("PVC") substrate. The disclosure of U.S. Pat. No. 5,387,381 is also hereby incorporated by reference. Saloom's lone example and only disclosed high deflection or softening point temperature acrylic resin, KMAX T-260, is no longer commercially available due to environmental concerns of its manufacturer. No polycarbonates and no other known mixture of acrylics has been found to yield even the marginal wood-grain effect achieved by KMAX T-260. Moreover, the method disclosed in Saloom results in somewhat unpredictable results because of the difficulty in simultaneously controlling the melt flow index and deflection or softening point temperature of KMAX T-260. KMAX T-260 is a resin having a high deflection or vicat softening point temperature, and a low melt flow index. The Saloom method does not result in bold contrasting or "hard" streaking.

Furthermore, a continual need exists for decking products with improved durability and aesthetic qualities. Thus, there remains a need in the industry for a method of making simulated wood-grain plastic decking that gives predictable, controllable results in a pre-selected array of shadings and boldness of streaking, in which the decking planks display a realistic wood-grain appearance, strongly accented against the background.

DETAILED DESCRIPTION OF THE INVENTION

The present invention is related to specific additives and formulations that provide particular, customized appearances for plastic parts, in particular for decking products. The effects include that of stone, wood and various appearance characteristics found in other naturally occurring materials. The particular stone "effects" include the appearance characteristics found in synthetic, man-made, metamorphic, sedimentary and/or igneous rocks or natural formations. The particular wood effects include those of grain, color, texture and patterns of synthetic and/or naturally occurring wood and wood-like products, or other organic materials.

The particular components of the present invention include styrene polymers, e.g., acrylic, acrylic-styrene-acrylonitrile (ASA), acryonitrile-ethylene-propylene-styrene (AES) or other transparent, opaque and/or translucent, weatherable polymers, or a combination of polyvinyl chloride (PVC) and one or more of the above-noted polymers. The "special effect" ingredients include pearlescent pigments, mixed-metal oxides or organic pigments, and variously sized or shaped particles of other materials. These materials will offer desirable visual effects including flakes, pellets, chips, fibers of the various metals, thermoplastic or thermoset polymers, animal, mineral or plant products, or parts.

The ingredients are preferably extruded or molded into finished parts, having a resulting gloss and texture suitable to produce the desired appearance. Furthermore, the "special effects" ingredients comprise less than about 75% of the overall formulation. Additional details concerning the manufacture of such materials are found in U.S. Pat. No. 5,866,054, hereby incorporated by reference.

Thus, the present invention relates to a method of producing a plank product having a controllable and realistic wood-grain appearance, the plank product with at least one accent color, the method comprising the steps of: a)introducing into an extruder a powdered or pelletized base material and accent color pellets, said base material containing less than about 75% by weight wood flour, and having a vicat softening temperature, said accent color pellets (i) having a higher vicat softening temperature than said base material, and (ii) comprising a styrene polymer having a high vicat softening temperature and a melt flow index of greater than or equal to 1.0 gram per 10 minutes, and at least one additional resin having a substantially lower vicat softening temperature than the styrene polymer; and b) extruding said base material and said accent color pellets through an extrusion die to form a plank under processing temperatures whereby the accent color pellets cause delayed introduction and controlled dispersion of the accent color into the plank material. The step of introducing said accent color pellets preferably includes controlling the dispersion of said accent color according to the relative quantities of poly-.alpha.-methylstyrene and said lower vicat softening temperature resin. The pellets may be introduced into said extruder in an amount of about 1% to about 25% by weight of total material introduced into said extruder.

Note that the pellets may have a vicat softening temperature that is about 15° C. to about 50° C. higher than the vicat softening temperature of the base material, and more preferably have a vicat softening temperature that is about 20° C. to about 40° C. higher than the vicat softening temperature of the base material. The pellets may also have a vicat softening temperature of about 100° C. to about 160° C., with a vicat softening temperature of about 110° C. to about 150° C. more preferred, and a vicat softening temperature of about 120° C. to about 140° C. most preferred.

The additional resin may be an acrylic, and the base material may be selected from the group consisting of polyvinyl chloride, polypropylene, polyethylene, and polystyrene, and mixtures thereof. In a further embodiment, the present invention comprises the step of introducing into said extrusion die a substrate producing material, and co-extruding said substrate producing material with said base material and said accent color producing material to produce a plastic article.

In an additional embodiment, the present invention relates to a method of producing a plank product having a controllable and realistic wood-grain appearance, the plank product with at least one accent color, the method comprising the steps of: a) introducing into an extruder a surface layer base material and accent color pellets, said base material containing less than about 75% by weight wood flour, and having a vicat softening temperature, said accent color pellets having a vicat softening temperature that is higher than the vicat softening temperature of said base material, said accent color pellets comprising (i) about 5% to about 50% by weight poly-.alpha.-methylstyrene, (ii) about 10% to about 60% by weight of at least one additional resin having a substantially lower vicat softening temperature than the poly-.alpha.-methylstyrene, and (iii) about 10% to about 65% by weight of a color pigment; and b) extruding said base material and said accent color pellets through an extrusion die to form a plank under processing temperatures whereby the accent color pellets cause delayed introduction and controlled dispersion of the accent color into the capstock base material. The poly-.alpha.-methylstyrene noted above preferably has a vicat softening temperature greater than about 170° C., with the pellets preferably comprising about 12% to about 27% by weight poly-.alpha.-methylstyrene and about 35% to about 45% by weight of the additional resin, and with the pellet comprising about 16% to about 25% by weight poly-.alpha.-methylstyrene and about 28% to about 44% of the additional resin being particularly preferred.

The color pigment is e.g., titanium dioxide, and the poly-.alpha.-methylstyrene has a vicat softening temperature preferably greater than about 151° C.

In a further preferred embodiment of the present invention, a powdered PVC compound containing an amount less than about 75% by weight wood flour is added to an extruder, with less than about 50% by weight wood flour particularly preferred. Also, a streaker concentrate is preferably added at the feed throat of the extruder. Such streaker concentrates are commercially available. Note that production scale processing would be expected to be carried out on extruders, thermoforming or injection molding equipment. Note also that it is not necessary to have the wood flour incorporated into the PVC compound at the time it enters the extruder; the compound and wood flour could be separate streams introduced simultaneously at the feed throat of the extruder, or the wood flour could even be incorporated partially down the extruder, by way of side feeding extruders, for instance.

A wood grained deck product may be coextruded to more easily achieve the desired effect. The surface, or cap, layer could be composed of a preferred polymer containing up to about 75% wood flour and/or other organic or inorganic filler, to which the special effects component(s) are added. These components are most likely to be added at the feed throat of the extruder. The core material could be produced using a polymer compatible with the polymer used in the surface layer and may also have streak effect additives incorporated in it. For example, in the case of PVC, ASA, AES or acrylic surface layer polymer, PVC, acrylonitrile butadiene styrene (ABS) or polystyrene may be suitable polymers for the core. In the case of polypropylene or other poly-olefin surface layer polymers, polypropylene, polyethylene or a similar polymer could be used in the core. The core could also contain up to about 75% wood flour and/or other organic or inorganic fillers.

While the preferred polymer is likely to be PVC, one of the other polymers mentioned, namely ASA, AES, polystyrene or acrylic, are also anticipated to be effective for purposes of the present invention. In addition, polypropylene and polyethylene are possible options. It is conceivable that mechanical wood grain texturing on the surface of the part could also enhance wood grain color effects in the part. There are various methods for imparting a physical texture to the surface, e.g., mechanical embossing, laser etching, mechanical abrasion, etc.

While this invention has been described in detail and with reference to specific examples thereof, it will be apparent to one skilled in the art that various changes and modifications can be made therein without departing from the spirit and scope thereof.

What is claimed is:

1. A method of producing an article having a controllable and realistic wood-grain appearance with at least one accent color, the method comprising the steps of:
    a) introducing into an extruder a powdered or pelletized base material and accent color pellets, said base material comprising a first polymer and wood flour, and having a vicat softening temperature, said accent color pellets (i) having a higher vicat softening temperature than said base material, and (ii) comprising a second polymer having a high vicat softening temperature and a melt flow index of greater than or equal to 1.0 gram per 10 minutes, and at least one additional resin having a substantially lower vicat softening temperature than the second polymer; and
    b) extruding said base material and said accent color pellets through an extrusion die to form the article under processing temperatures whereby the accent color pellets cause delayed introduction and controlled dispersion of the accent color into the base material.

2. The method of claim 1, wherein the step of introducing said accent color pellets includes controlling the dispersion of said accent color according to relative quantities of the second polymer comprising poly-.alpha.-methylstyrene and said lower vicat softening temperature resin.

3. The method of claim 2, wherein said pellets are introduced into said extruder in an amount of about 1% to about 25% by weight of total material introduced into said extruder.

4. The method of claim 1, wherein said pellets have a vicat softening temperature that is about 15° C. to about 50° C. higher than the vicat softening temperature of the base material.

5. The method of claim 4, wherein said pellets have a vicat softening temperature that is about 20° C. to about 40° C. higher than the vicat softening temperature of the base material.

6. The method of claim 1, wherein said pellets have a vicat softening temperature of about 100° C. to about 160° C.

7. The method of claim 6, wherein said pellets have a vicat softening temperature of about 110° C. to about 150° C.

8. The method of claim 7, wherein said pellets have a vicat softening temperature of about 120° C. to about 140° C.

9. The method of claim 1, wherein the additional resin is an acrylic.

10. The method of claim 1, wherein the first polymer is selected from the group consisting of polyvinyl chloride, polypropylene, polyethylene, and polystyrene, and mixtures thereof.

11. The method of claim 1, further comprising the step of introducing into said extrusion die a substrate producing material, and co-extruding said substrate producing material with said base material and said accent color producing material to produce a plastic article.

12. A method of producing a plank product having a controllable and realistic wood-grain appearance, the plank product with at least one accent color, the method comprising the steps of:
   a) introducing into an extruder a surface layer base material and accent color pellets, base material containing less than about 75% by weight wood flour, and having a vicat softening temperature, said accent color pellets having a vicat softening temperature that is higher than the vicat softening temperature of said base material, said accent color pellets comprising (i) about 5% to about 50% by weight styrene polymer, (ii) about 10% to about 60% by weight of at least one additional resin having a substantially lower vicat softening temperature than the styrene polymer, and (iii) about 10% to about 65% by weight of a color pigment; and
   b) extruding said base material and said accent color pellets through an extrusion die to form a plank under processing temperatures whereby the accent color pellets cause delayed introduction and controlled dispersion of accent color into the base material.

13. The method of claim 12, wherein the styrene polymer has a vicat softening temperature greater than about 170° C.

14. The method of claim 12, wherein the pellets comprise about 12% to about 27% by weight styrene polymer and about 35% to about 45% by weight of the additional resin.

15. The method of claim 12, wherein the pellets comprise about 16% to about 25% by weight styrene polymer and about 28% to about 44% of the additional resin.

16. The method of claim 12, wherein the color pigment is titanium dioxide.

17. The method of claim 12, wherein the additional resin is an acrylic.

18. The method of claim 12, wherein the styrene polymer has a vicat softening temperature greater than about 151° C.

19. The method of claim 12, where the base material comprises polyvinyl chloride.

20. The method of claim 12, further comprising the step of introducing into said extrusion die a substrate producing material, and co-extruding said substrate producing material with said surface layer base material and said accent color producing material to produce a plastic article.

21. The method of claim 1, wherein the extruding of said base material and said accent color pellets is by coextrusion to form a cap layer.

22. The method of claim 1, wherein the base material comprises a filler.

23. The method of claim 12, wherein the base material comprises a filler.

24. The method of claim 1, wherein the extrusion die feeds injection molding equipment.

25. The method of claim 1, further comprising the step of imparting a physical texture to a surface of the article.

* * * * *